United States Patent [19]

Nakanishi et al.

[11] Patent Number: 5,475,513
[45] Date of Patent: Dec. 12, 1995

[54] PROJECTION TYPE IMAGE DISPLAY DEVICE MAINTAINING RESOLUTION OF AN IMAGE UNAFFECTED BY PARALLAX

[75] Inventors: Hiroshi Nakanishi, Tenri; Hiroshi Hamada; Akitsugu Hatano, both of Nara, all of Japan

[73] Assignee: Sharp Kabushiki Kaisha, Osaka, Japan

[21] Appl. No.: 249,638

[22] Filed: May 26, 1994

[30] Foreign Application Priority Data

Jun. 2, 1993 [JP] Japan .................................. 5-131833
Apr. 22, 1994 [JP] Japan .................................. 6-085072

[51] Int. Cl.$^6$ .............................. G02F 1/1335; G02F 1/133
[52] U.S. Cl. ................................ 359/40; 359/41; 359/42; 359/53
[58] Field of Search ................................ 359/40, 41, 42, 359/53, 73; 353/33

[56] References Cited

U.S. PATENT DOCUMENTS

| 5,083,854 | 1/1992 | Zampolin et al. | 359/40 |
| 5,329,388 | 7/1994 | Yoshimizu | 359/53 |

FOREIGN PATENT DOCUMENTS

| 255386 | 2/1990 | Japan . |
| 2-149823 | 6/1990 | Japan . |
| 4-181226 | 6/1992 | Japan . |
| 4-204919 | 7/1992 | Japan . |

OTHER PUBLICATIONS

"A 1.9-in. 1–5-MPixel Driver Fully–Integrated Poly–Si TFT–LCD for HDTV Projection", Takafuji et al., Society for Information Display International symposium Digest of Technical Papers vol. XXIV, May 18–20, 1993.

Primary Examiner—Anita Pellman Gross
Assistant Examiner—James A. Dudek
Attorney, Agent, or Firm—Birch, Stewart, Kolasch & Birch

[57] ABSTRACT

An image display device is arranged to have a liquid crystal light valve, a liquid crystal display panel, a backlighting unit, and a rod lens array. The liquid crystal light valve serves to form an image from the light applied thereto. The liquid crystal display panel serves to form a light pattern to be written to the liquid crystal light valve. The backlighting unit serves to apply light to the panel. The rod lens array is located between the liquid crystal panel and the liquid crystal light valve so that each of the light acceptance angle θ (half angle) and the degree of parallelization α (half angle) of light are not less than $\tan^{-1}\{P/(3\frac{1}{2}\cdot L)\}$ (P is a pitch and L is a distance between the incident end of light and the pixel of the matrix type liquid crystal display panel) and at least one of the light acceptance angle θ (half angle) and the degree of parallelization α of light is 20° or less.

9 Claims, 8 Drawing Sheets

PROJECTION TYPE IMAGE DISPLAY DEVICE MAINTAINING RESOLUTION OF AN IMAGE UNAFFECTED BY PARALLAX

BACKGROUND OF THE INVENTION

1. Field of the Invention

The present invention relates to a projection type image display device, in particular, the projection type image display device which operates to magnify an image appearing on a liquid crystal display and project the magnified image onto the screen.

2. Description of the Related Art

Figure 10:
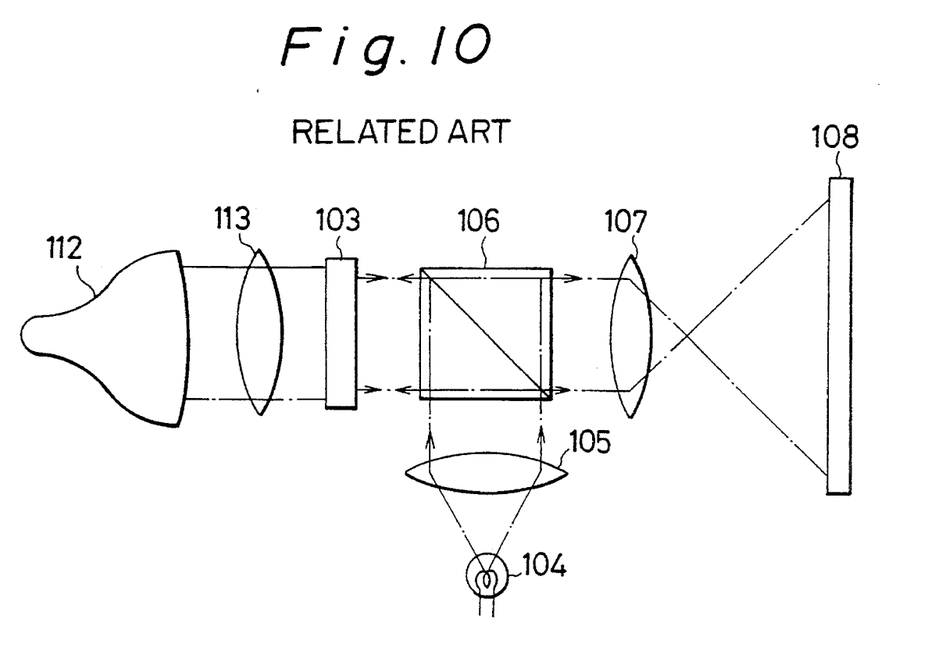
FIG. 10 is a diagram showing an image display device with a CRT according to a related art of the invention.

FIG. 10 shows an optical arrangement of a projection type image display device according to a first related art of the invention. The projection type image display device is arranged to have a reflective type liquid crystal light valve provided with a photoconductive layer. As shown, this type display device includes a CRT 112 for displaying an original image, a reflective type light valve 103 for forming and holding an image for the displayed image, a lens 113 located between the CRT 112 and the light valve 103, a light source 104 for applying a ray, a polarizing beam splitter 106 for applying the light from the light source 104 and passing specific polarized components of the light (reflected light) from the light valve, a lens 105 located between the light source 104 and the polarizing beam splitter 106, a projecting lens 107 for receiving the light passed through the polarizing beam splitter 106 and magnifying the image formed of the light, and a screen 108 on which the projected image is formed.

When the image is displayed on the projection type image display device, the image displayed on the CRT 112 is applied to the reflective type liquid crystal light valve 103 through the lens 113 and the light source applies light of the liquid crystal light valve 103.

Figure 11:
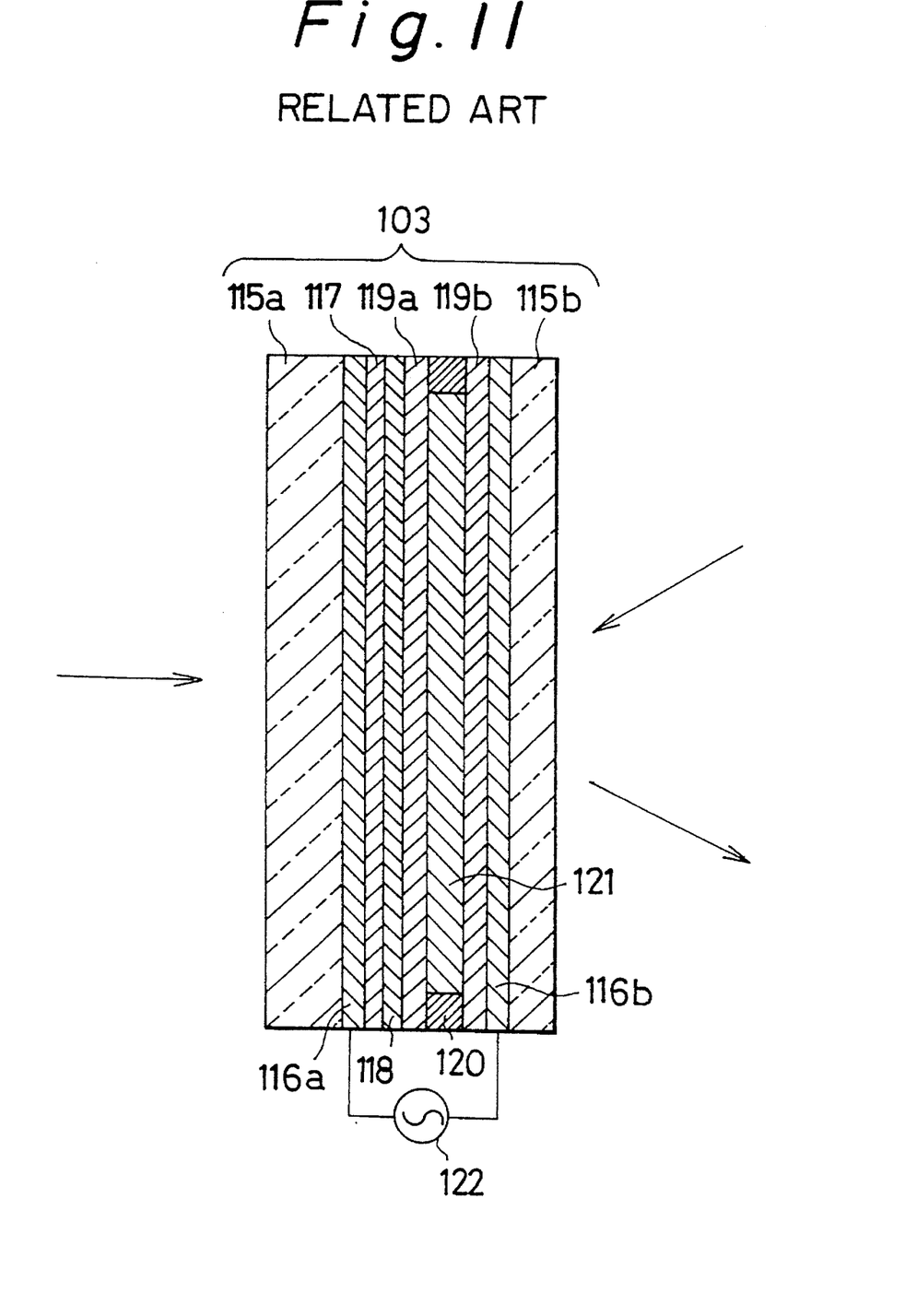
FIG. 11 is an expanded view showing a reflective type liquid crystal light valve of the related art shown in FIG. 10.

FIG. 11 is a section showing an arrangement of the reflective type liquid crystal light valve 103. As shown, the light valve 103 is composed of a pair of glass substrates 115a, 115b, transparent electrodes 116a, 116b, and a photoconductive layer 117. The transparent electrodes 116a and 116b are formed of transparent conductive films (ITO) on the glass substrates 115a and 115b, respectively. Then, amorphous silicon hydride (a-Si:H) is formed on the transparent electrode 116a and is served as the photoconductive layer 117. The amorphous silicon hydride (a-Si:H) is formed as the photoconductive layer 117 on the transparent electrode 116a. The amorphous silicon hydride is formed of silane gas and hydrogen gas by means of a plasma CVD method. A multilayered film of $TiO_2$ and $SiO_2$ is formed on the photoconductive layer 117 by means of the sputtering method. On the multilayered film, the polyimide films are spin-coated as orientation films 119a and 119b. Then, the molecular orientating treatment is done on the orientation films 119a and 119b by means of the rubbing technique. The resulting glass substrates 115a and 115b are pasted with a spacer 120 laid therebetween.

Mixing nematic liquid crystal having a chiral material added thereto is injected and sealed between the glass substrates 115a and 115b. This serves as a liquid crystal layer 121. The resulting composition is a hybrid field-effect mode reflective type liquid crystal light valve 103. The light valve 103 uses as an operating mode a vertical ECB mode or a guest host (GH) mode.

Between the transparent electrodes 116a and 116b included in the light valve 103 arranged as above, there is applied a voltage from an A.C. power source 122. When the image from the CRT 112 enters from the glass substrate 115a, the impedance of the photoconductive layer 117 changes depending on the quality of incident light. With this change, the voltage applied to the liquid crystal layer 121 is changed, thereby changing the orientation of the liquid crystal, so that the image corresponding to the image from the CRT 121 may be formed on the liquid crystal layer 121.

The light from the light source 104 enters into the reflective type liquid crystal light valve 103 on which an image is formed through the lens 105 and the polarizing beam splitter 106, the incident light is reflected on a dielectric mirror 118 composing the light valve 113. Since the reflected light is passed through the portion of the liquid crystal layer 102 whose orientation, the reflected light changes its polarizing direction through the electro-optical effect. Hence, the selected reflected portion is allowed to be passed through the polarizing beam splitter 106.

Figure 12:
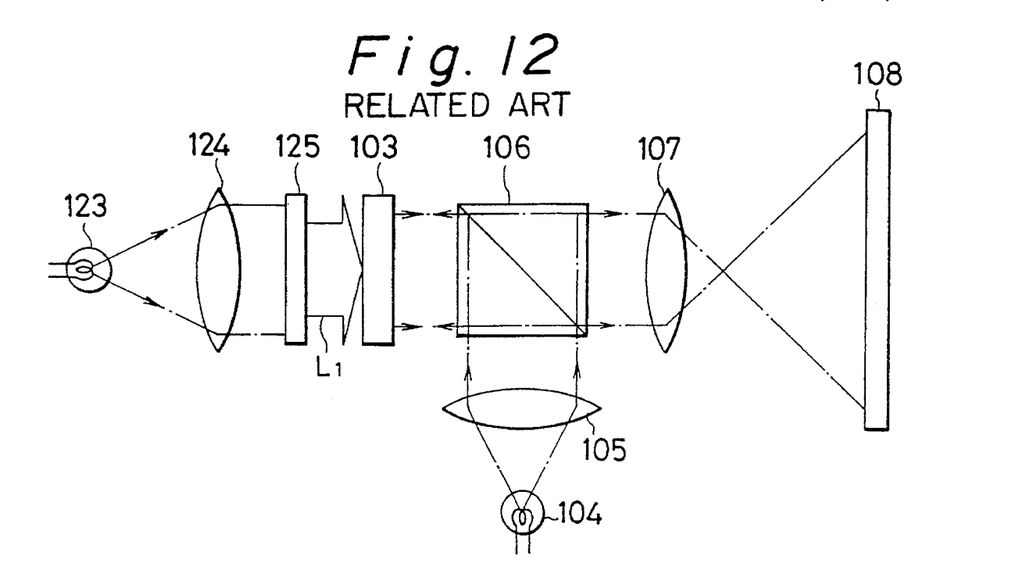
FIG. 12 is a diagram showing an image display device with a transmittance type display panel according to a second related art of the invention.

This reflected light is magnified through the effect of the projective lens 107. The image formed on the light valve 103 is projected onto the screen 108. In turn, the description will be oriented to an optical arrangement of a projection type image display device according to the second related art of the invention with reference to FIG. 12. This second related art is analogous to the first related art. Hence, the corresponding components have the same reference numbers. As disclosed in Japanese Patent Lying Open No. Hei 4-181226 or Hei 4-204919, the second related art is arranged so that a light source 123 may apply light to a transmittance display panel 125 and the light L1 passed through the panel 125 may form an image on the reflective type liquid crystal light valve 108.

The use of the transmittance type display panel makes it possible to reduce the image display device in size. Recently, a high-resolution transmittance type display panel is now developed. The transmittance type display panel 125 used in the second related art does not operate to be luminous but the transmittance of the display panel 125 is changed on the driving signal so that the display panel 125 may modulate the intensity of the light from the light source provided in another light source for displaying an image or character. In this related art, several displays having light-passivation ceramics have been proposed such as a liquid crystal display panel, an electrochromic display, or a PLZT. In particular, the liquid crystal display panel is widely used for a pocket-sized TV (Television), a wordprocessor, or a projector. It is substantially completed.

Figure 13:
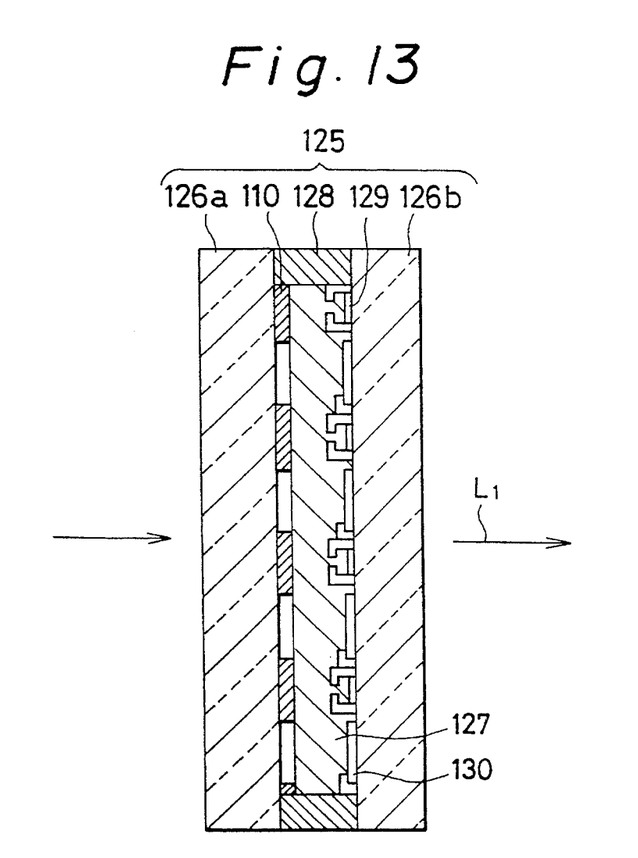
FIG. 13 is a diagram showing an active-matrix type liquid crystal display.

FIG. 13 shows an active-matrix liquid crystal panel as an example of a transmittance display panel 125. The liquid crystal panel is composed of a pair of opposite substrates 128a and 128b, a spacer 128 for keeping an interval between these opposite substrates, a liquid crystal layer 127 sealed between the opposite substrates 126a and 126b, a switching element 129, a pixel area 130, both of which are formed on the opposite substrate (TFT substrate) 126b, and a light cut-off layer 110 formed on the opposite substrate 126a and having an opening for the pixel area.

In the foregoing arrangements, when an image displayed on the transmittance display panel is written in the photoconductive layer 117 of the reflective type liquid crystal light valve 103, the thickness of the glass substrate brings about a parallax, thereby making the image vague and lowering resolution. To cope with these shortcomings, it is necessary to form the overall display screen onto the photoconductive layer through the effect of just one lens. However, this arrangement makes the writing optical system larger in size.

To keep the image clear, the overall image of the transmittance display panel is focussed on the photoconductive layer through the effect of one lens. This method enlarges the writing optical system.

Further, the Japanese Patent Lying Open No. Hei 2-149823 discloses a technique in which fiber plates are used in place of the glass substrates for making the optical system compact. However, the fiber plate is so expensive that the overall image display device may be very costly.

To solve the above shortcomings, the Japanese Patent Lying Open No. Hei 2-55386 has disclosed a technique of providing means for forming an erected image with the same magnification, for example, a rod lens array between the CRT and the reflective type liquid crystal light valve. With this forming means, the image of the CRT is formed on the photoconductive layer. The thickness of the glass substrate does not bring about a parallax and the optical system is made compact.

This technique, however, does not disclose a concrete acceptance angle of a rod lens array, a size of the image display means, a pitch of display pixels, or degree of parallel light. Further, at the filing time (August, 1988) of the patent, no liquid crystal panel which has a higher resolution and is smaller than the CRT had been developed. Hence, the technique provides no concept of using a liquid crystal panel in place of the CRT.

The U.S. Pat. No. 5,083,854 discloses a technique of locating a rod lens array between the liquid crystal panel and the reflective type liquid crystal light valve, magnifying a pixel opening of the liquid crystal display panel, and forming the magnified pixel portion onto the photoconductive layer. Moreover, the Japanese Lying Open No. Hei 2-149823 discloses a technique of locating the fiber plate on the glass substrate located on the writing light source side of the reflective type liquid crystal light valve.

However, the prior art disclosed in the Japanese Patent Lying Open No. Hei 2-55386 uses the CRT. The reduced CRT offers a lower resolution because of the smaller diameter of an electron beam forming the image and the bleeding of a fluorescent material. Hence, the critical size of the CRT suitable to the HDTB is 5 inches. It means that the reduction of the optical system is limited. Further, since the CRT is effected by the geomagnetism, the image may be distorted or a conversion shift may take place in the three plate type projection using the reflective type liquid crystal light valve for each of the RGB colors.

The prior art disclosed in the U.S. Pat. No. 5,083,854 is required to correspond the rod lens array to the liquid crystal display panel in one-to-one manner on the principle of the operation. Both of the pitches have to coincide with each other. In recent days, however, the liquid crystal panel is developed to have a pixel pitch of 100 μm or less. The high-definition liquid crystal panel corresponding to the HDTV is recently developed to have a pitch of 30 μm or less (SID '93 digest pp. 888 to 886), while the now commercially available rod lens array is manufactured to have a pitch of 1 mm or less (Selfoc Lens produced by Japan Sheet Glass Company, Limited, for example). It is quite difficult to technically make both of them coincide with each other. If this difficult is overcome, one rod lens serves to prevent double image Formation of pixels adjacent to each other and thereby restrict the degree of parallel light. Hence, the writing light is made quite dark. If the pixel is shifted out of the rod lens, a moire pattern may take place. Hence, both of them are required to be accurately positioned. The positioning is quite troublesome.

The technique of locating the fiber plate on the glass substrate on the writing light source of the reflective type liquid crystal light valve, as disclosed in the Japanese Patent Lying Open No. Hei 2- 149828, enhances the cost of the image display device because the fiber plate itself is quite costly.

SUMMARY OF THE INVENTION

It is a first object of the present invention to provide an image display device which is arranged to output an image having a lower resolution resulting from a parallax if the glass substrate is used.

It is a second object of the present invention to provide an image display device which provides a compact optical system and outputs a high resolution image.

In carrying out the first object, according to a first aspect of the present invention, a projection type image display device includes: an optically writing type liquid crystal light valve; a matrix type liquid crystal display panel for forming a light pattern to be rewritten to the liquid crystal light valve; and means for forming an erected image with the same magnification, the means being located between the matrix type liquid crystal display panel and the liquid crystal light valve.

The means for forming an erected image with the same magnification operates to form each pixel area on the photoconductive layer of the light valve. This makes it possible to realize an image whose resolution is not lowered by the parallax.

Figure 4:
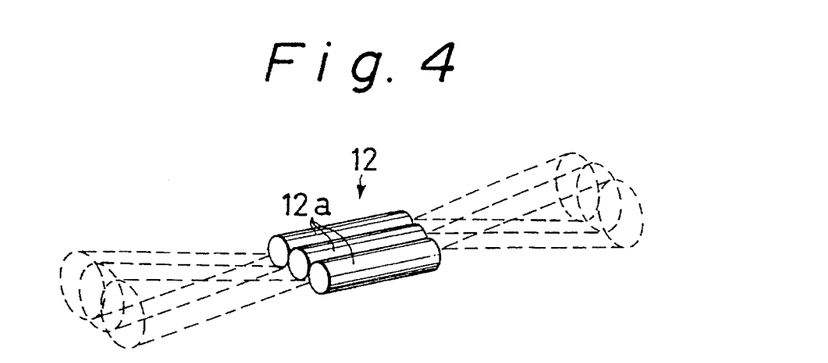
FIG. 4 is a perspective view showing a rod lens array included in the display device shown in FIG. 3.

As a preferable example of the means for forming an erected image with the same magnification, a refractive factor distribution type rod lens array may be referred as shown in FIG. 4.

Figure 5:
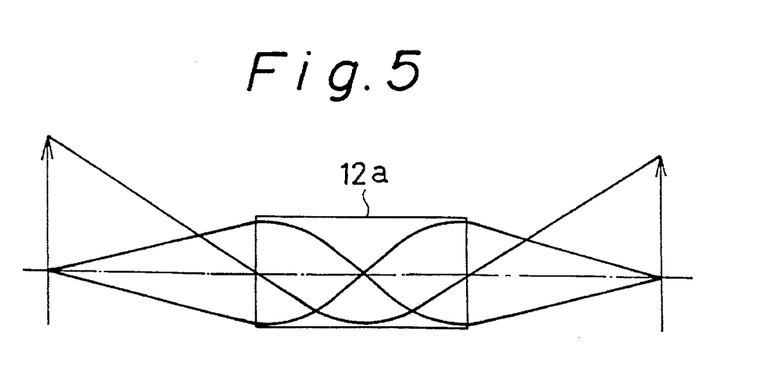
FIG. 5 is an explanatory view showing a principle of refraction of the rod lens array.

The refractive factor distribution type rod lens, as shown in FIG. 5, is a rod-like lens whose refractive factor is diminished from the center axis to the peripheral portion. The conventional lens operates to refract light on a curved I/O end surface and form an image from the refracted light, while the refractive factor distribution type rod lens operates to continuously refract the light according to the refractive factor distribution formed inside of the rod and to form the image from the refracted light. Hence, if both of the ends are planar, the rod lens serves as a lens effect.

The refractive factor distribution type rod lens makes it possible to restrict the acceptance angle. If the backlighting unit is used for the light source, no lower contrast is brought about on the vision characteristic of the matrix type liquid crystal display panel for forming an image to be written.

Though the image-forming range covered by each refractive factor distribution type rod lens is narrow, by locating the refractive factor distribution type rod lenses like an array matrix and slightly overlapping the adjacent rod lenses with each other, the overall screen is allowed to be completely covered by the rod lenses. It is therefore unnecessary to align the refractive factor distribution type rod lenses to the liquid crystal display panel.

In carrying out the second object, according to a second aspect of the invention, a projection type image display device includes: an optical writing type liquid crystal light valve for forming an image from light applied thereto; a matrix type liquid crystal display panel for forming a light pattern to be written to the light valve; lighting means for applying light to the matrix type liquid crystal display panel; means for forming an erected image with the same magnification, for receiving light output from the matrix type liquid crystal display panel, the means being located between the matrix type liquid crystal panel and the liquid crystal light valve; and the means for forming an erected image with the same magnification having each of a light acceptance angle θ (half angle) and a degree of parallelization α (half angle) of the light output from the lighting means being not less than $$\tan^{-1}\{P/(3^{1/2} \cdot L)\}$$

and at least one of the light acceptance angle θ (half angle) and the degree of parallelization α (half angle) being not greater than 20°, wherein P is a pitch of the means for forming an erected image with the same magnification and L denotes a distance between the light-incident end of the means for forming an erected image with the same magnification and the pixel of the matrix type liquid crystal display panel.

According to a third aspect of the invention, a projection type image display device is characterized in that the matrix type liquid crystal display panel has a diagonal length of 76 mm (three inches size) or less.

According to a fourth aspect of the invention, a projection type image display device is characterized in that the pitch of the pixels composing the matrix type liquid crystal display panel is 100 μm or less.

According to a fifth aspect of the invention, a projection type image display device is characterized in that the main light from the lighting means is applied to a vertical of the matrix type liquid crystal display panel in a manner to be inclined toward the viewing angle of the matrix type liquid crystal display panel.

In operation, the projection type image display device according to the second aspect of the invention keeps the light acceptance angle θ (half angle) and a degree of parallelization α (half angle) of the light output from the lighting means not less than $$\tan^{-1}\{(P/(3^{1/2} \cdot L)\}$$

in which P denotes a pitch of the means for forming an erected image with the same magnification, L denotes a distance between the light-incident end and the pixel of the matrix type liquid crystal display panel means) and at least one of the acceptance angle θ (half angle) and the degree of parallelization α (half angle) equal to or lower than 20°. Hence, the image display device keeps the resolution proper against the parallax and outputs a high-contrast image.

The projection type image display device according to the third aspect of the invention has a diagonal length of 76 mm (three inches size) or less in the matrix type liquid crystal display panel. Hence, the optical system of the display device is made compact.

The projection type image display device according to the fourth aspect of the invention provides a pixel pitch of 100 μm or less in the matrix type liquid crystal display panel. Hence, the optical system of the image display is made more compact.

The projection type image display device according to the fifth aspect of the invention operates to apply the main light of the light output from the fiber light source through the collimate lens to a vertical of the matrix type liquid crystal display panel means, as being inclined to the vision direction of the matrix type liquid crystal display panel means. Hence, the light is applied to the most approximate vision direction of the liquid crystal display panel in order to obtain an image with a higher contrast.

Further objects and advantages of the present invention will be apparent from the following description of the preferred embodiments of the invention as illustrated in the accompanying drawings.

DESCRIPTION OF THE PREFERRED EMBODIMENTS

In turn, the description will be oriented to a projection type image display device arranged to use a Selfoc Lens manufactured by the Japan Sheet Glass Company, Limited, according to a first embodiment of the invention.

Figure 1:
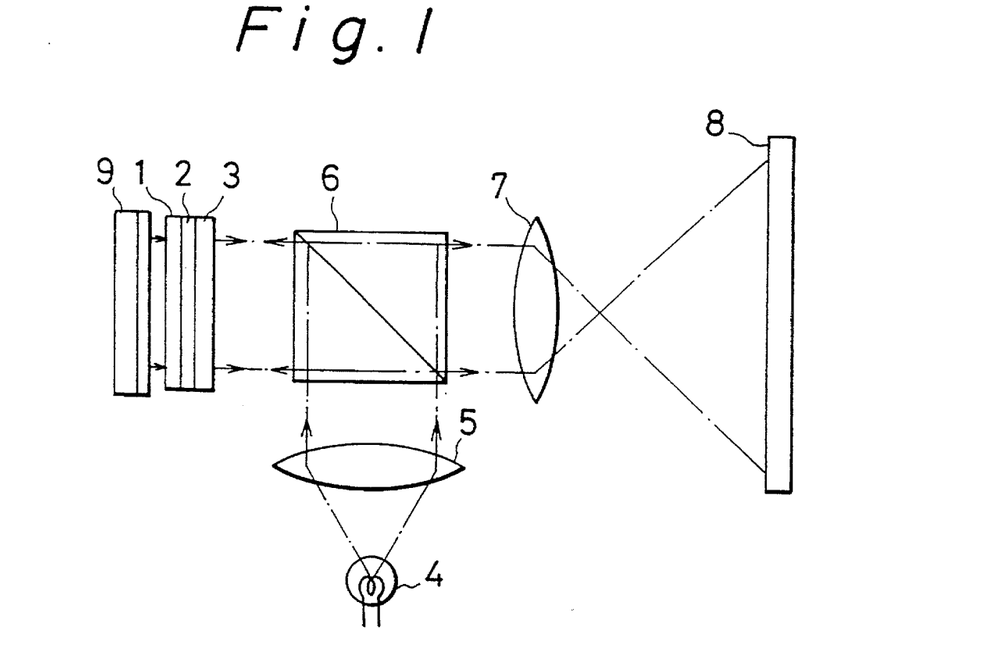
FIG. 1 is a diagram showing a projection type image display device according to a first embodiment of the present invention.

FIG. 1 is a model view showing the projection type image display device according to this embodiment. As shown in FIG. 1, a numeral 1 denotes an active-matrix liquid crystal display panel, in which a pixel pitch consists of 120×120 μm in the horizontal and vertical and an opening consists of 60×60 μm in the horizontal and vertical. The arrangement of the display panel is the same as that shown in FIG. 13.

The liquid crystal display panel 1 operates to selectively transmit or cut off the writing light so that the writing light corresponding to the image to be displayed may be entered into a photoconductive layer 11 of a reflective type liquid crystal light valve 3.

The light valve 3 has the same composition as that shown in FIG. 11. As shown, the liquid crystal display panel 1, the Selfoc Lens 2 and the light valve 3 are integrally composed with one another for forming a single liquid crystal shutter.

To project the image displayed on the reflective type liquid crystal light valve 3 onto a screen 8, the light from a light source 4 is condensed through a condensing lens 5 and the condensed light is polarized into a linear beam through the effect of a polarizing beam splitter 6. The linear beam enters the reflective type liquid crystal light valve 3. The entered beam is reflected by a dielectric mirror 118, one of the components of the light valve 3 and again enters the polarizing beam splitter 6. If the beam impinging on the dielectric mirror 118 is passed through the image-displayed portion of the liquid crystal layer, that is, the portion of the liquid crystal to which an electric field is applied as result of the beam impinging onto the photoconductive layer 11, the passed beam changes its direction of polarization through the electro-optical effect of the liquid crystal. Hence, the passed beam is allowed to pass through the polarizing beam splitter 6. The passed light is projected on the screen 8 through the projecting lens 7. In addition, a numeral 9 denotes a backlighting unit for writing an image.

Figure 2:
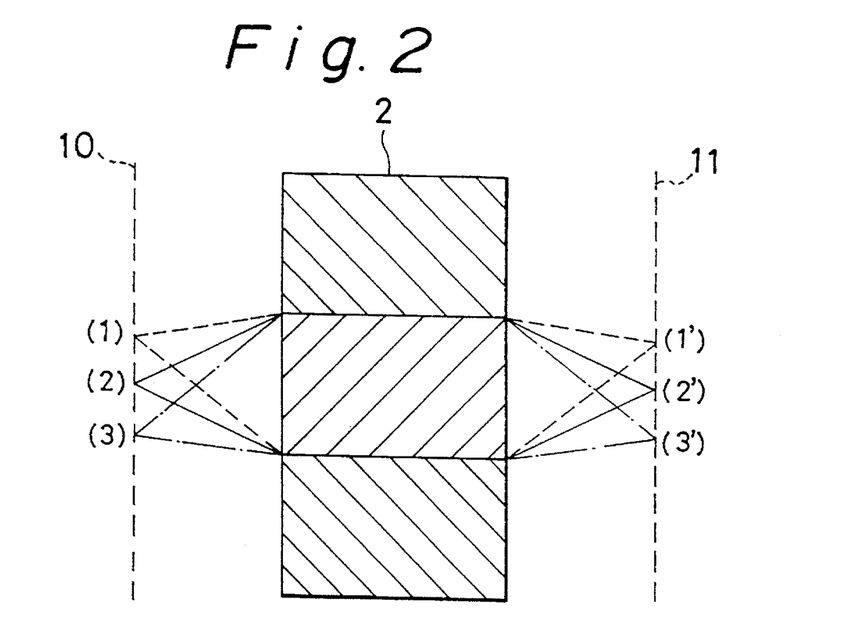
FIG. 2 is an expanded view showing a rod lens array included in the display device shown in FIG. 1.

FIG. 2 shows a fundamental composition of the Selfoc Lens. The Selfoc Lens 2 has a diameter of 1.2 mm ∅ and a distance of 720 μm between an object and a lens or a lens and an image (which corresponds to 1.1 mm on the glass substrate having a refractive factor of 1.52) and serves to form an erected image with the same magnification. Plural rod lenses are arranged like an array. The glass substrate of the reflective type liquid crystal light valve 3 has a thickness of 1.1 mm. As a result, the image of the pixel opening is formed on the photoconductive layer through the effect of the Selfoc Lens 2 and the obtained image keeps the same resolution against the parallax.

In this embodiment, as the refractive factor distribution type rod lens, the Selfoc Lens manufactured by the Japan Sheet Glass Company, Limited is used. In place, any lens may be used if it has a function of forming an erected image with the same magnification such as "SMILE lenses" manufactured by the Corning Inc.

Figure 3:
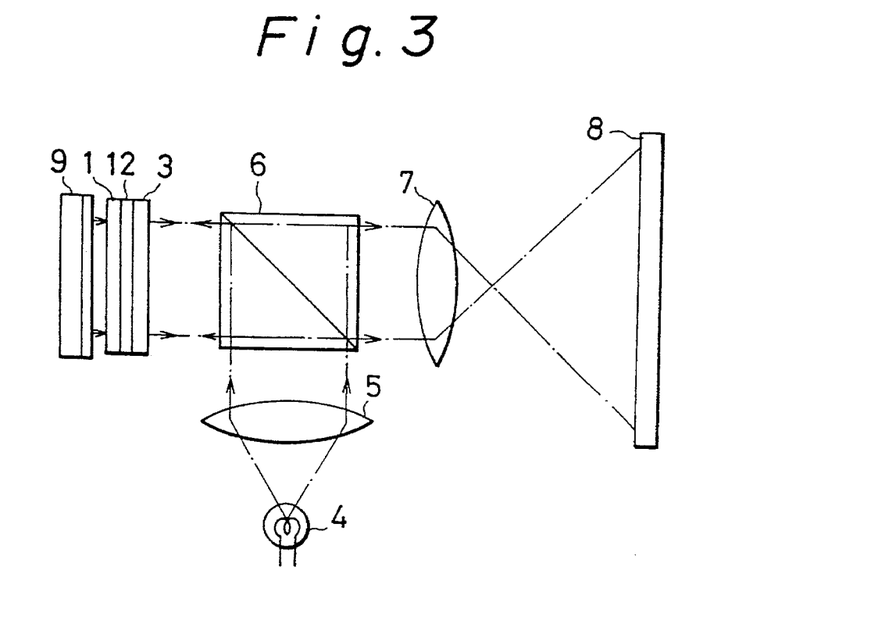
FIG. 3 is a diagram showing a projection type image display device according to a second embodiment of the present invention.

In turn, the description will be oriented to a projection type image display device according to a second embodiment of the present invention with reference to FIG. 3.

The projection type image display device according to the second embodiment of the invention has the substantially same arrangement as that according to the first embodiment. Hence, the same components as those of the first embodiment have the same reference numbers. As shown, the display device is arranged to have a backlighting unit 9 serve as means for applying light. A liquid crystal display panel having a diagonal length of 76 mm (three inches size) 1 serves as the matrix type liquid crystal display panel for forming a light pattern. A rod lens array 12 serves to form a light pattern formed on the panel 1 as means for forming an erected image with the same magnification. A reflective type liquid crystal light valve 3 forms an image for the light from the rod lens array 12. A reading light source 4 delivers light to a condensing lens 5 converts the light from the reading light source 4 into parallel rays. The parallel rays enter a polarizing beam splitter 6 which reflects the light in the predetermined polarizing direction. A projective lens 7 magnifies the reflected light passed through the splitter 6, and projects the magnified image onto a screen 8. The composition of the light valve 3 is the same as that shown in FIG. 13. Hence, it is not described. Like the first embodiment, the pixel pitch of the panel 1 consists of 40×40 μm in the vertical and the horizontal and the opening consists of 20×20 μm in the vertical and the horizontal. The liquid crystal display panel 1 uses an active-matrix system.

Figure 6A:
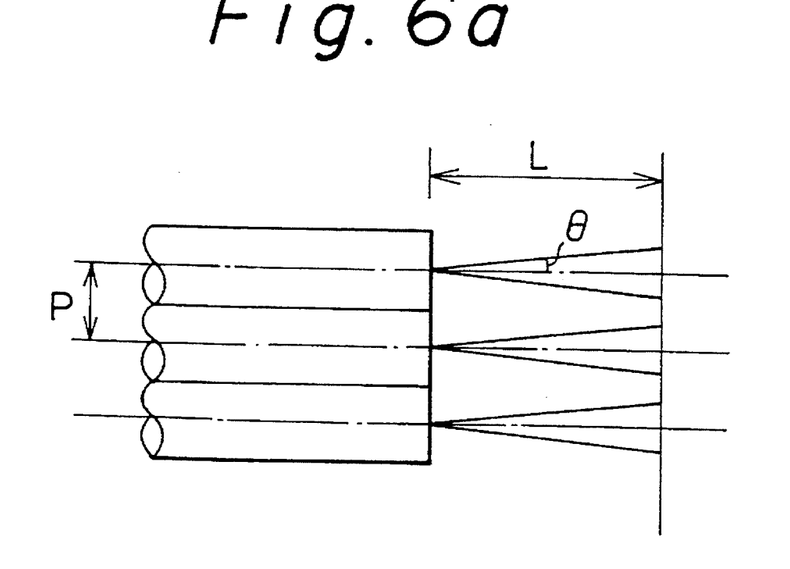
FIGS. 6a and 6b are views showing an incident angle of the rod lens array included in the display device shown in FIG. 3.
Figure 6B:
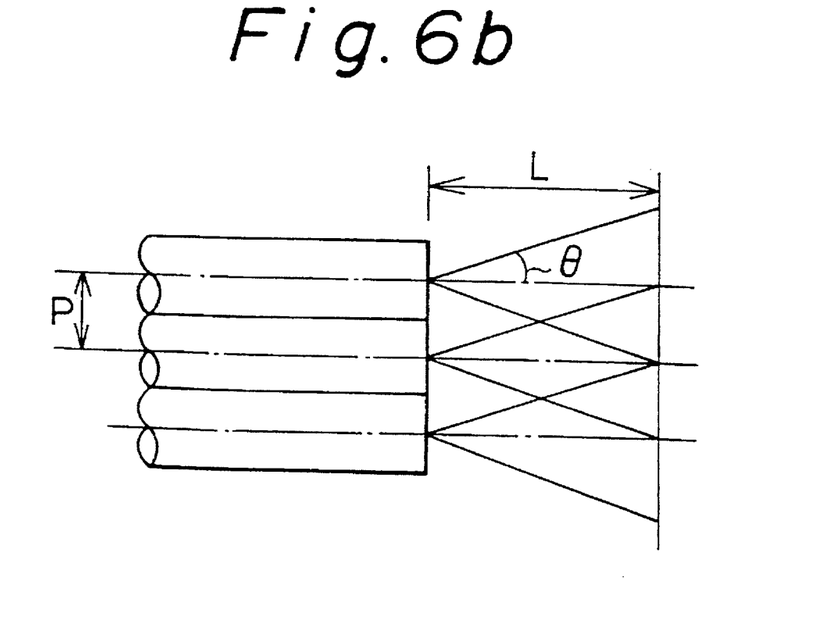

The rod lens array 12, as shown in FIG. 4, includes plural rod lenses 12a laminated like a staggered matrix. The rod lens 12a is formed to diminish the refractive factor from the central axis to the peripheral portion. The conventional lens serves to refract the light on the curved end at which light is input or output for forming an image from the refracted light, while the rod lens, as shown in FIG. 5, serves to continuously refract the light on the refractive factor distribution formed inside of the rod lens for forming the image. Hence, if both of the ends are planar, the rod lens serves as a lens. As shown in FIG. 6a and FIG. 6b, the rod lens enables to restrict an acceptance angle θ by itself. As shown in FIG. 6a, if the acceptance angle θ is too small, the image-forming range for which each rod lens takes responsibility is so narrow that the image-forming ranges of the rod lenses are not overlapped with each other even if the rod lenses are located in an array manner. Thus, lots of voids appear on the image on the screen.

Figure 7:
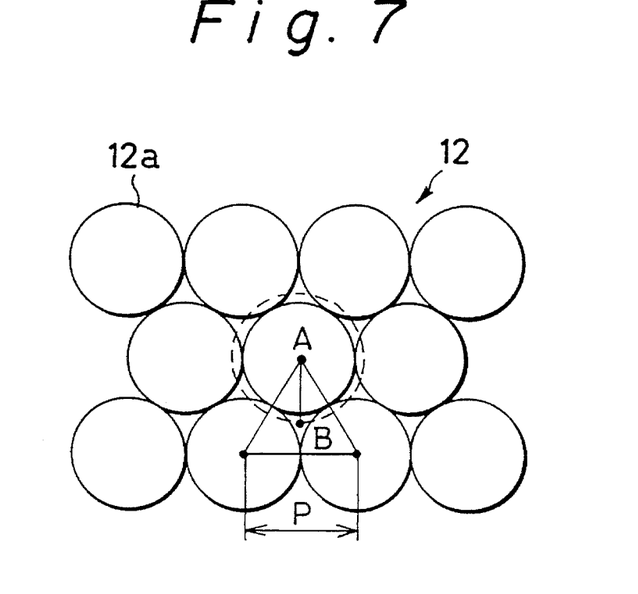
FIG. 7 is an elevation showing the rod lens array included in the display device shown in FIG. 3.

To overcome this disadvantageous state, it is necessary to set the acceptance angle to be a following value or higher. The rod lens array 12 is arranged so that the rod lenses are piled as shown in FIG. 7. To overlap the image-forming ranges of the rod lenses 12a with each other without any void on the image, assuming that a pitch of the rod lens 12a is P, a distance between the incident end of light and the pixel of the matrix type liquid crystal display panel is L, and the acceptance angle is θ (half angle), the image-forming range is required to be not less than the range covered by a dotted line of FIG. 7. For example, the radius of the image-forming range is required to be longer than the segment AB. Hence, it is necessary to set the acceptance angle θ to meet with the condition of:

$$\tan^{-1}\{P/(3^{1/2} \cdot L)\} \leq \theta$$

wherein A denotes a center of the rod lens 12a and B denotes a center of a regular triangle connecting three rod lenses.

If, however, the acceptance angle is set to be too large, as shown in FIG. 6b, the image contrast is made lower on the dependency of a view angle of the liquid crystal display panel. This invention, therefore, selects a minimum acceptance angle required to allow the image-forming ranges to be overlapped as a lower limit or such an acceptance angle as obtaining a higher contrast than a practical contrast, for example, 100 or more as an upper limit, for regulating the acceptance angle of the rod lens.

Though the acceptance angle of the rod lens is restricted, the degree of parallelization of light applied to the liquid crystal display panel 1 is regulated as the acceptance angle of the rod lens. This regulation makes it possible to offer the same effect.

The high-contrast optimal angle of view of the liquid crystal display panel depends on the rubbing direction. It is inclined by several angles against the vertical of the liquid crystal panel. Hence, it is more effective to restrict the acceptance angle and the degree of parallelization of light by inclining the light or the liquid crystal display panel in a manner to allow the light to enter into the display panel in the optimal direction of an angle of view. According to the present invention, it is not necessary to align the rod lens with the liquid crystal display panel.

Next, the operation of the second embodiment will be described below.

The light applied from the backlighting source 9 is selectively passed or cut off by the liquid crystal display panel 1. The passed light reaches the photoconductive layer 11 of the reflective type liquid crystal light valve 3 through the rod lens array 12.

The light from the reading light source 4 is condensed by the condensing lens 5 and is polarized into a linear beam by the polarizing beam splitter 6. Then, the linear beam is entered into the reflective type liquid crystal light valve 3. The light entered into the light valve 3 is reflected on the dielectric mirror 118 (see FIG. 11) and again enters into the polarizing beam splitter 8 (see FIG. 3). If the light reflected on the dielectric mirror 118 is passed through the portion of the liquid crystal layer on which the image is displayed or the portion of the liquid crystal to which an electric field is applied by entering the light to the photoconductive layer 11, the passed light changes the polarizing direction through the electro-optical effect of the liquid crystal so that the passed light may pass through the beam splitter 6. The passed light is magnified by the projecting lens 7 so that the image formed on the light valve 3 may be projected onto the screen 8.

For example, the Selfoc Lens (trademark) manufactured by the Japan Sheet Glass Company, Limited is used as the rod lens array 12. In this embodiment, as shown in FIG. 2, each rod lens has a diameter of 1.2 mm ø and a distance of 8 mm between an object and a lens or a lens and an image and serves to form an erected image with the same magnification. The rod lens are piled at a pitch of 1.3 mm like a two-dimensional array. The acceptance angle θ (half angle) is $$\tan^{-1}\{1.3/(3^{1/2}\cdot 8)\}=5.3°\leq \theta \leq 20°$$

Hence, θ=10° is established.

Under the above condition, the image displayed on the liquid crystal display panel 1 is formed on the photoconductive layer 11 by the rod lens array 12. Hence, the image display device disables to lower the resolution in spite of the parallax and enables to offer an image of 100 or more contrast.

The foregoing embodiment has been described by using the Selfoc Lens manufactured by the Japan Sheet Glass Company, Limited. Any lens may be used if it provides a function of forming an erected image with the same magnification such as "SMILE lenses" manufactured by the Corning Inc.

Figure 9:
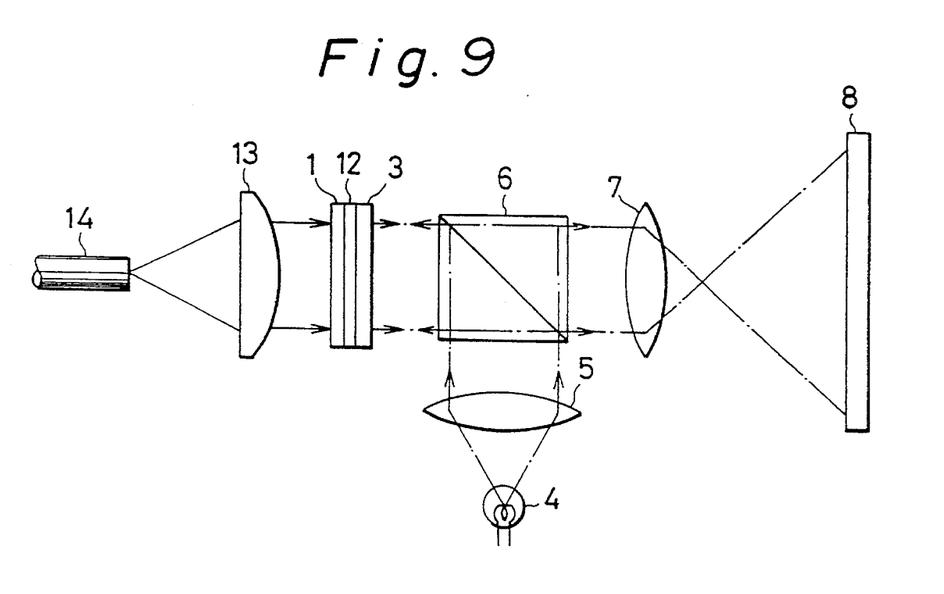
FIG. 9 is a diagram showing a projection type image display device according to a third embodiment of the invention.

Next, the description will be oriented to a projection type image display device according to a third embodiment of the present invention with reference to FIG. 9. The same components as those of the second embodiment shown in FIG. 3 have the same reference numbers and thus are not described.

The projection type image display device provides a fiber light 14 served as a light source and a collimating lens 13 having a focal distance of 60 mm. The fiber light has an outgoing end of 21 mm ø. The collimating lens 13 serves to regulate the degree of parallelization of the light. The rod lens has the same diameter, pitch, and distance between an object and a lens or a lens and an image as those of the second embodiment. By using 25° as the acceptance angle, the degree of parallelization α is allowed to be set by the following formula.

$$\alpha = \tan^{-1}(21/2.60)$$
$$= 10°$$

Hence, like the first embodiment, it is possible to obtain a high-resolution and high-contrast image.

Figure 8:
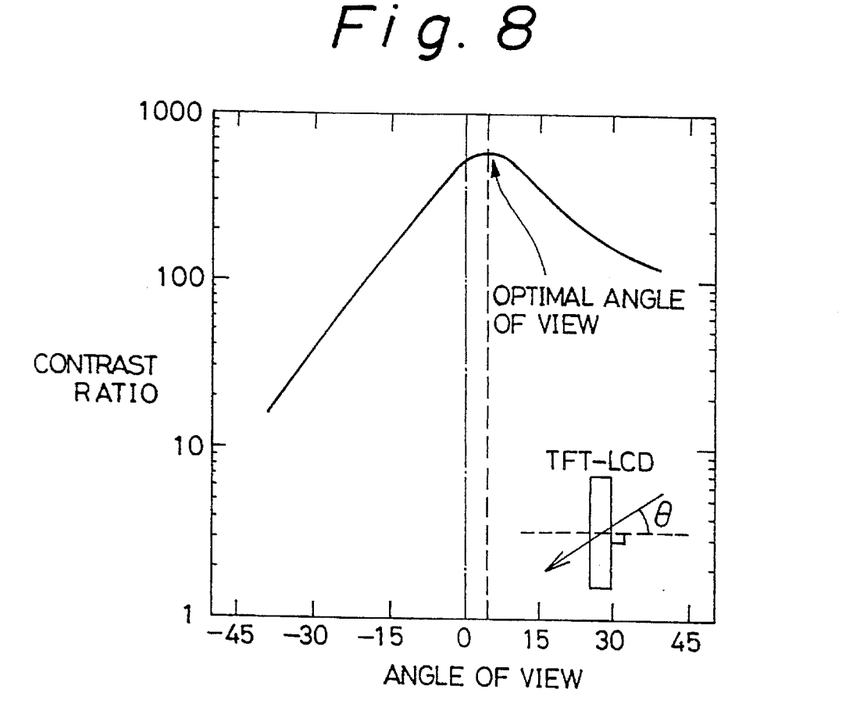
FIG. 8 is a graph showing dependency of an angle of view on a contrast ratio of the liquid crystal display panel.

Further, by shifting the outgoing end of the fiber light source 14 out of the optical axis, the light angle distribution is inclined toward the optimal angle of view of the liquid crystal display panel as shown in FIG. 8 by about 4° for obtaining a higher contrast of the resulting image.

Many widely different embodiments of the present invention may be constructed without departing from the spirit and scope of the present invention. It should be understood that the present invention is not limited to the specific embodiments described in the specification, except as defined in the appended claims.

What is claimed is:

1. A projection type image display device comprising:

an optically writing type liquid crystal light valve;

a matrix type liquid crystal display panel which forms a light pattern to be written to said liquid crystal light valve; and erected image forming means located between said matrix type liquid crystal display panel and said liquid crystal light valve, for forming an erected image on said liquid crystal light valve having a size identical to a size of said light pattern formed on said liquid crystal display panel, so as to keep the resolution of said erected image against the parallax, said erected image forming means having a plurality of lenses, each lens corresponding to a plurality of pixels of said matrix type liquid crystal display panel.

2. A projection type image display device according to claim 1, wherein said erected image forming means is a refractive factor distribution type rod lens array.

3. A projection type image display device comprising:

an optical writing type liquid crystal light valve which forms an image from light applied thereto;

a matrix type liquid crystal display panel which forms a light pattern to be written to said light valve;

lighting means for applying light to said matrix type liquid crystal display panel; and erected image forming means located between said matrix type liquid crystal display panel and said liquid crystal light valve, for forming an erected image on said liquid crystal light valve having a size identical to a size of said light pattern formed on said liquid crystal display panel, both a light acceptance angle θ (half angle) of said erected image forming means and a degree of parallelization α (half angle) of the light output from said lighting means being not less than $$\tan^{-1}\{P/(3^{1/2}\cdot L)\}$$

and at least one of said light acceptance angle θ (half angle) and said degree of parallelization α (half angle) being not greater than 20°, wherein P is a pitch of said erected image forming means and L denotes a distance between the light-incident end of said erected image forming means and the pixel of said matrix type liquid crystal display panel.

4. A projection type image display device according to claim 3, wherein the pitch of the pixels composing said matrix type liquid crystal display panel is 100 μm or less.

5. A projection type image display device according to claim 3, wherein said matrix type liquid crystal display panel has a diagonal length of 76 mm (three inches size) or less.

6. A projection type image display device according to any one of claims 3 to 5, wherein the main light from said lighting means is applied to a vertical of said matrix type liquid crystal display panel in a manner to be inclined toward the viewing angle of said matrix type liquid crystal display panel.

7. A method of forming an image having a resolution unaffected by parallax, comprising the steps of:

forming a light pattern to be written to a liquid crystal light valve on a matrix liquid crystal display panel;

providing a plurality of lenses each corresponding to a plurality of pixels of said matrix liquid crystal display panel; and forming an erected image of said light pattern the same size as said light pattern on said light valve through said plurality of lenses.

8. A method according to claim 7, further comprising setting a light acceptance angle θ (half angle) of said plurality of lenses being not less than $$\tan^{-1}\{P/(3^{1/2} \cdot L)\}$$

wherein P is a pitch of said plurality of lenses and L is a distance between a light incident end of said plurality of lenses and the pixel of said matrix liquid crystal display.

9. A method according to claim 7, further comprising:

applying light to said matrix liquid crystal display panel via a light guide; and setting a degree of parallelization of the light output from said light guide to be not less than $$\tan^{-1}\{P/(3^{1/2} \cdot L)\}$$

wherein P is a pitch of said plurality of lenses and L is a distance between a light incident end of said plurality of lenses and the pixel of said matrix liquid crystal display.

* * * * *